United States Patent
Milton

[11] 3,923,377
[45] Dec. 2, 1975

[54] HIGH ANGLE OPTICAL RAY SEPARATOR

[75] Inventor: A. Fenner Milton, Washington, D.C.

[73] Assignee: The United States of America as represented by the Secretary of the Navy, Washington, D.C.

[22] Filed: Nov. 29, 1974

[21] Appl. No.: 528,516

[52] U.S. Cl. .................. 350/96 C; 350/96 WG
[51] Int. Cl.² .............................. G02B 5/14
[58] Field of Search ............. 350/96 C, 96 WG

[56] References Cited
UNITED STATES PATENTS

| | | | |
|---|---|---|---|
| 3,295,911 | 1/1967 | Ashkin et al. | 350/96 WG |
| 3,387,909 | 6/1968 | Anderson et al. | 350/96 C |
| 3,453,036 | 7/1969 | Swope et al. | 350/96 C |
| 3,777,149 | 12/1973 | Marcatill | 350/96 C |
| 3,780,295 | 12/1973 | Kapron et al. | 350/96 C |
| 3,864,019 | 2/1975 | Smolinsky et al. | 350/96 C X |

OTHER PUBLICATIONS
Marcuse, "The Modes of Graded-Index Slab Wave-Guides," *IEEE Journal of Quantum Electronics*, Vol. QE-9, No. 10, Oct. 1973, pp. 1220-1226.

*Primary Examiner*—James B. Mullins
*Attorney, Agent, or Firm*—R. S. Sciascia; Arthur L. Branning; Melvin L. Crane

[57] ABSTRACT

A device for separating optical radiation traveling in a multi-fiber bundle. Rays having a large angle relative to the fiber bundle axis are separated from rays having propagation angle close to the axis by inserting an optically transparent dielectric rod such as PYREX, having an index of refraction $n_1$, between two portions of the fiber bundle. A layer of material of lower index of refraction $n_2$ covers the rod and is itself covered by a tapered layer having an index of refraction $n_1$. All rays having large angles relative to the fiber bundle axis will be transmitted in the third ($n_1$) layer.

6 Claims, 8 Drawing Figures

HIGH ANGLE OPTICAL RAY SEPARATOR

BACKGROUND OF THE INVENTION

This invention is directed to an optical connector for joining two optical fiber transmission lines together and more particularly to an optical connector for separating optical radiation traveling in a multimode fiber optic bundle transmission line at a large angle to the axis of the fiber bundle from optical rays which have propagation close to the axis of the bundle.

Heretofore optical fiber bundles have been used for transmitting light from one place to another. Straight-through couplings have been used which permit coupling two optical fiber bundles together without any light loss between the bundle paths. There is a need for coupling light into and from an optical transmission line without interrupting the flow of transmission. Such lines may be used for communications, as well as other purposes.

Optical radiation traveling in a multimode fiber optic bundle transmission line have light rays at different angles to the axis of the bundle. It is well known in the prior art that fiber optic bundles will transmit radiation which make an angle with the fiber axis up to the critical angle of the fiber determined by the difference in the index of refraction between the core and cladding. If transmission lines are long enough those angles greater than the critical angle will be lost within the transmission line due to absorption and scattering. This radiation could be used without loss to the remainder of the radiation being transmitted.

SUMMARY OF THE INVENTION

This invention provides a connector for coupling two optical transmission lines together for transmitting optical radiation which makes an angle with the fiber axis up to a critical angle. The connector specifically couples optical radiation having an angle greater than the critical angle out of the transmission line for other uses. The main section of the coupler is provided with a special coating which has an index of refraction less than that of the main section. Thus, radiation up to the critical angle will be reflected and pass through the coupler. Radiation with a greater angle than critical will not be reflected by the coating and will pass into a tapered slab secured above the coating. The tapered surface will reflect the radiation to the end where it will pass out the end surface or be reflected by a mirror on the end surface.

DETAILED DESCRIPTION

Figure 1:
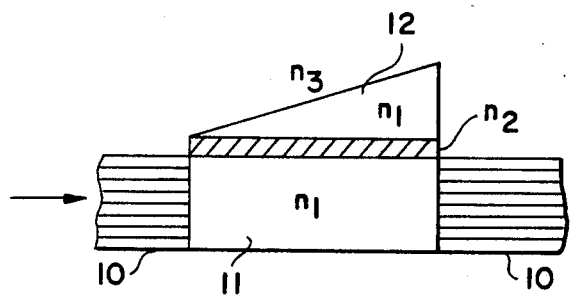
FIG. 1 illustrates a side view of an optical coupler in a multimode optical fiber bundle transmission line suitable for separating radiation traveling at a large angle to the axis of the fiber bundle from the rays which have propagation directions close to the axis.

Now referrring to the drawings, wherein like reference characters refer to like parts, there is shown by illustration in FIG. 1 an optical radiation transmission line coupler made in accordance with the teaching of this invention. As shown, the multimode optical fiber bundle transmission line 10 is coupled together by an optical coupler. The optical coupler includes a flat end optically transparent dielectric rod 11 having an index of refraction $n_1$ having the same cross sectional area as the ends of the transmission line to which it is connected in optical alignment, without any loss of radiation. A tapered dielectric slab 12 of index of refraction $n_1$ is secured onto the dielectric rod 11 and separated therefrom by a thin layer of optically transparent material 13 having an index of refraction $n_2$ where $n_1 > n_2$. The tapered dielectric slab and exposed sides of the dielectric rod are surrounded by the atmosphere or some other material which has an index of refraction $n_3$ which is less than $n_1$. $n_3$ may be equal to $n_2$. The optical transmission line dielectric rod and tapered slab of materials are formed of a material with a high index of refraction and surrounded by a material of lower refractive index whereby each member conducts light according to the principles of total internal reflection. Thus, multimode optical fibers propagate optical radiation rays which make an angle with the fiber axis up to the critical angle of the fiber determined by the difference in index of refraction between the core and cladding material. The critical angle, $\theta$crit, is related to the numerical aperture (N.A.) of the fibers by N.A. $= n \sin \theta$crit where $n$ is the index of refraction of the fiber core material.

In operation of the device of FIG. 1, optical radiation from the transmission line is introduced into the dielectric rod with an angle with respect to the axis of $\theta$ where $\theta < \theta$crit. The index of refraction, $n_2$ of the thin layer is selected so that $$\sin \theta\text{crit} > \sin \theta_1 = \sqrt{\frac{n_2^2}{n_1^2} - 1}.$$

With this arrangement, all optical rays entering the dielectric rod with $\theta$ less than $\theta_1$ will be reflected by the thin layer and pass straight through the dielectric rod. Optical rays with $\theta$ greater than $\theta_1$ will not be reflected by the thin layer of material and will be passed into the tapered slab and be trapped there by the tapered surface from which it will be reflected. Reflection from the tapered surface will change the angle of propagation with respect to the axis and the rays in the tapered slab will exit out the end of the slab.

Figure 2:
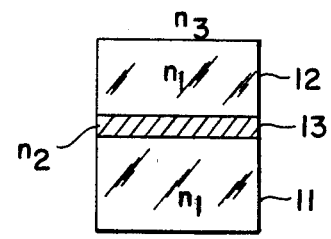
FIG. 2 is an end view of the device of FIG. 1 illustrating its relative parts and the cross sectional area.

FIG. 2 illustrates an end view of the device of FIG. 1 to illustrate the cross sectional area.

Figure 3:
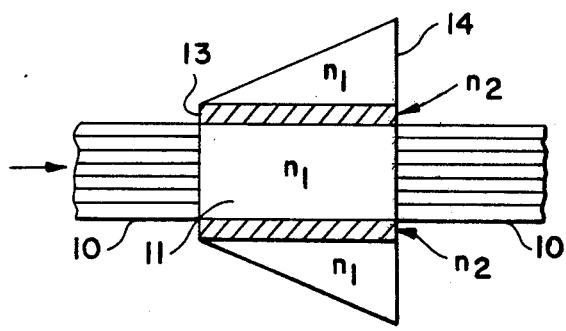
FIG. 3 is a modification of the device of FIG. 1.

FIG. 3 illustrates a device similar to that of FIG. 1 wherein the outer tapered slab material 14 encircles the dielectric rod as in a conical section and the lower index material 13 separates the tapered conical section from the dielectric rod 11. The radiation passing straight through the dielectric rod and the rays entering the conical section will be the same as described above for FIG. 1. With the conical section configuration of FIG. 3, all radiation rays which enter the dielectric rod with an angle $\theta$ less than $\theta_1$ will exit from the dielectric rod 11 whereas all rays which enter with $\theta$ greater than $\theta_1$ will exit from the outer ring end of the conical section.

Figure 4:
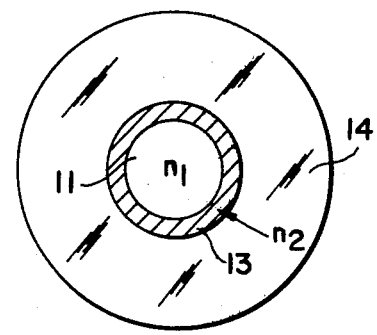
FIG. 4 is an end view of the device of FIG. 3.

FIG. 4 is an end view of FIG. 3 illustrating the relative parts and its cross sectional areas.

Figure 5:
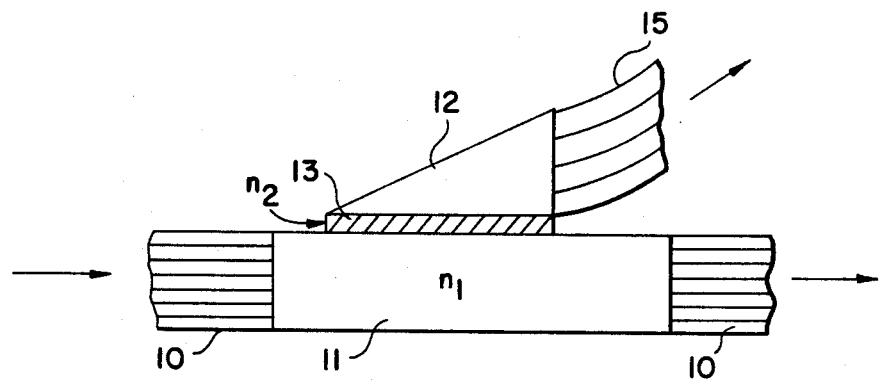
FIGS. 5–8 are modifications of the devices shown in FIG. 1.

The modification of FIG. 5 is the same as that shown in FIG. 1 and operates the same. The only difference is the coupler in FIG. 5 has a fiber optical transmission line 15 connected with the output end of the tapered slab. The light entering the tapered slab will enter the fiber optic bundle and be transmitted to any desired place.

Figure 6:
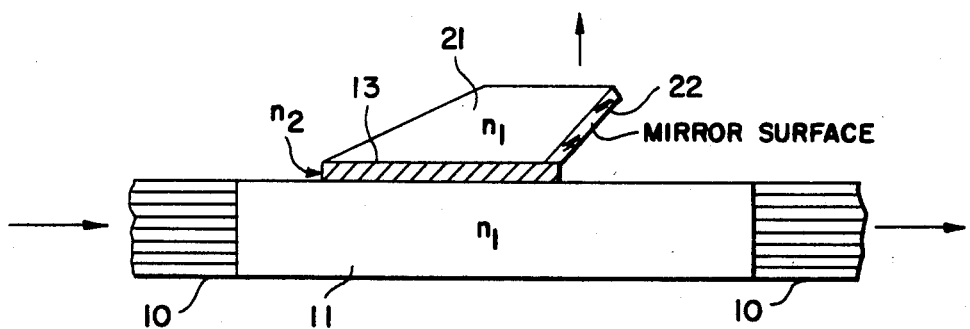

FIG. 6 illustrates a modification of the coupler shown in FIG. 1 in which the tapered slab 21 is provided with a mirror 22 on the outer end at a 45° angle with the optical axis which reflects incident radiation upwardly through a flat surface window in a direction perpendicular to the optical axis of the dielectric rod. Thus, the radiation that enters the tapered slab will be reflected out at an angle relative to the optical axis of the dielectric rod. The main radiation beam will be transmitted through the dielectric rod into the main transmission line.

Figure 7:
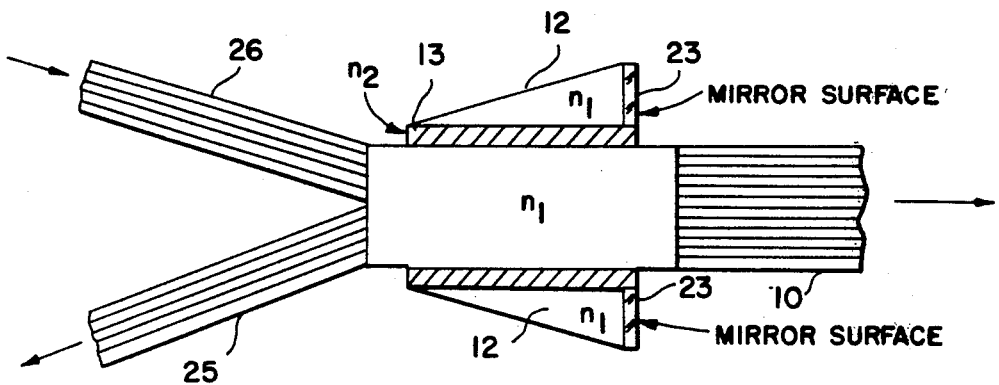

FIG. 7 illustrates a modification of the structure of FIG. 1 which includes a tapered slab 12 on the top and bottom of the dielectric rod. The front face of each tapered slab has a reflective surface 23 thereon which reflects the radiation back through the slab, through the dielectric rod and out through a fiber optic bundle 23 connected onto the radiation entrance end. Radiation enters through fiber bundle 26 and emerges from the dielectric rod through the main transmission line 10 and coupler as shown by the arrows.

Figure 8:
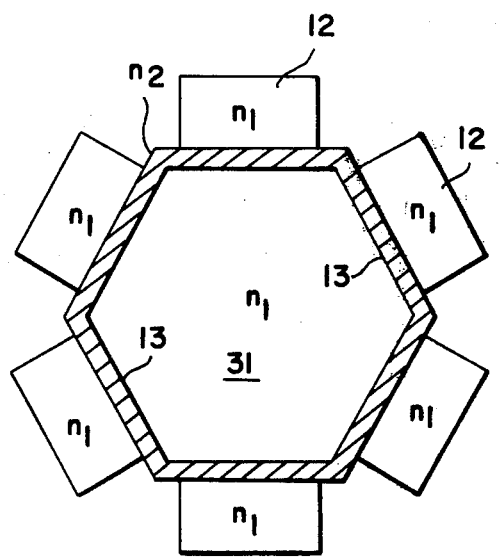

The modification shown in FIG. 8 illustrates a multiface dielectric rod such as a hexagon 31. Each face has a tapered slab connected thereto with a material 13 having a smaller index of refraction separating the dielectric rod faces from the tapered slabs secured thereon. Radiation transmitted into the dielectric rod will pass straight through the dielectric rod or enter the tapered slab as set forth above. The radiation will be reflected out of each of the tapered slabs and be transmitted over connected transmission lines as desired.

In these modifications in which radiation may be lost out through the side walls the radiation transmitted into the coupler must have an angle $\theta$ to the axis such that $$\sin \theta < \sin \theta_{crit} = \sqrt{\frac{n_3^2}{n_1^2} - 1}.$$

Where $n_3$ is the index of refraction of the surrounding medium.

The different modifications of the device allows output coupling or reflection of high angle optical rays propagating in a fiber optic bundle. Thus, the device may be used for transmitting a main beam of optical radiation through a coupler and into the main transmission line as well as directing radiation of a different angle out of the main transmission line into an auxiliary line.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. An optical connector for separating optical radiation traveling in a multimode fiber bundle transmission line at a large angle to the axis of said fiber bundle from the optical rays which have propagation close to the axis; which comprises:
   a dielectric rod of optical radiation transparent material having an index of refraction of $n_1$, which is connected into a separation in a main optical fiber bundle transmission line with its input end adjacent the output end of said separated fiber bundle transmission line and with its output end adjacent the input end of said separated fiber optic transmission line and having the same cross sectional area as said main transmission line,
   a thin layer of optical transparent material on one surface of said dielectric rod and having an index of refraction of $n_2$, where $n_2$ is less than $n_1$;
   at least one tapered slab of optical material secured onto said thin layer of optical material and having an index of refraction of $n_1$;
   said tapered slab positioned with the angle of incline increasing in the direction of radiation propagation in said main transmission line.

2. An optical connector as claimed in claim 1, wherein:
   said dielectric rod is a cylinder; and
   said tapered slab encircles said dielectric rod.

3. An optical connector as claimed in claim 1, wherein:
   said tapered slab includes a mirror on one end section at an angle relative to the optical axis of said dielectric rod with said angle sloped to reflect radiation away from said dielectric rod.

4. An optical connector as claimed in claim 3, wherein:
   said mirror on the end of said tapered slab is at an angle to reflect radiation back through said slab in a direction generally opposite from the direction of travel of the radiation in the main transmission line.

5. An optical connector as claimed in claim 1, in which:
   said dielectric rod has at least five equal sides; and
   a tapered slab secured opposite each side thereof.

6. An optical connector as claimed in claim 5, wherein:
   said dielectric rod has the shape of a hexagon.

* * * * *